May 15, 1962  O. C. HOLDERER  3,034,348

AIR BEARING DRAG BALANCE

Filed July 25, 1957

INVENTOR.
OSCAR C. HOLDERER
BY
W. E. Thibodeau & T. J. Lynch

United States Patent Office 3,034,348
Patented May 15, 1962

3,034,348
AIR BEARING DRAG BALANCE
Oscar C. Holderer, Huntsville, Ala., assignor to the United States of America as represented by the Secretary of the Army
Filed July 25, 1957, Ser. No. 674,262
2 Claims. (Cl. 73—147)
(Granted under Title 35, U.S. Code (1952), sec. 266)

The invention described herein may be manufactured and used by or for the Government for governmental purposes without payment of any royalties thereon.

This invention relates to a force measuring device for use in the experimental aerodynamic and related fields.

An important object of the invention is to measure the drag or axial forces on wind tunnel models particularly in conjunction with the testing of small slender test bodies.

A further object of the invention is to obtain an axial force measurement free of interaction from other force components. That is, in accordance with this invention it is possible to obtain axial force data which is free from and is not affected by other force components or moments acting on the model during the test. The inherent freedom from interaction is one of the basic advantages of this invention.

Still a further object of this invention is to provide for a suspension without friction of a test body so that its freedom of motion is restricted to a specific axis with reference to the test body in such a manner that it is completely unrestricted to move along this axis independent of forces acting on the test body at an angle to the axis.

It is still a further object of the invention to provide for an arrangement where a force sensing device is used in conjunction with the suspension without friction of the test body so that the force component acting in the direction of the axis of suspension can be measured and isolated from other incidental forces which are not parallel with this axis.

Another object of this invention is the feature that the force sensing device functions independently from the friction-free suspension arrangement, so that any suitable force measuring device of any desired sensitivity can be conveniently incorporated. This adds to the versatility of a basic unit, inasmuch as the force to be measured may vary considerably for different test conditions.

Still other objects and advantages of this invention will become readily apparent to one skilled in the art upon reading the following description of one preferred embodiment of my invention, taken in conjunction with the accompanying drawing, wherein the figures illustrate in cross section a typical embodiment of my invention.

Figure 1:
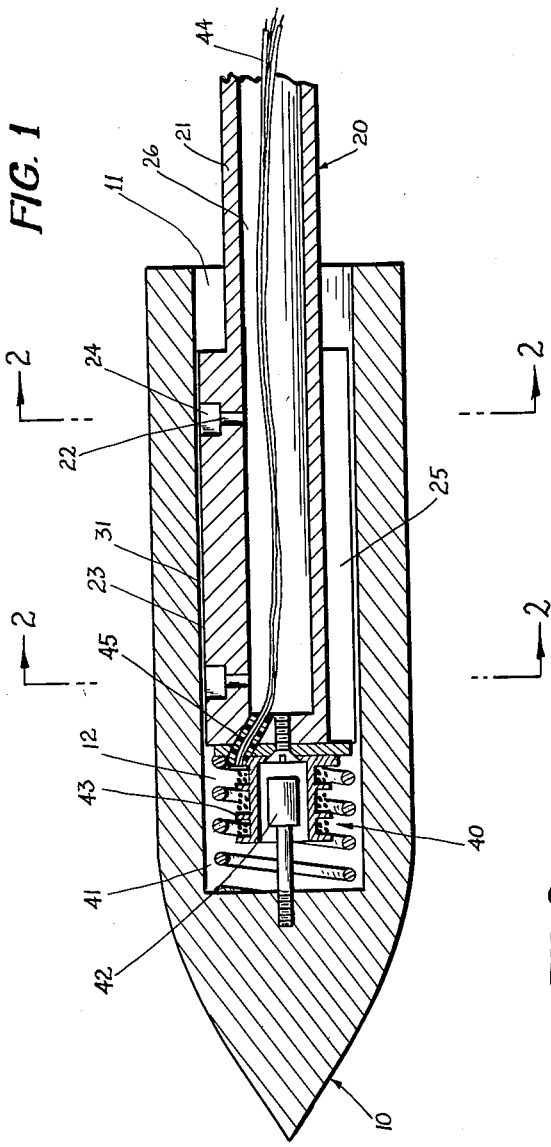

FIGURE 1 of the drawing shows a longitudinal cross section through a preferred embodiment of the invention.

Figure 2:
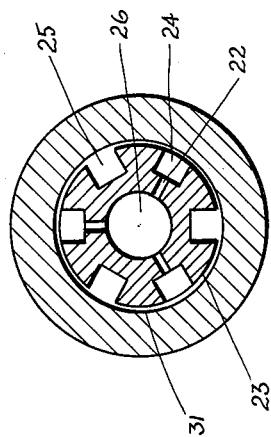

FIGURE 2 shows a cross section taken normal to the longitudinal axis as indicated in FIGURE 1.

A test model body 10 is provided with a bore 11 which is open toward the rear or downstream end of test model body 10. A support strut 20 engages with bore 11 and extends out of the rear of model body 10. Extension 21 is chucked at its far end (not shown) so as to support and align the model in a desired position in the wind tunnel. The portion of the support strut 20 which engages with bore 11 of model body 10 is provided with a plurality of axially spaced apart arrangement of orifices 22, counterbores 24, closely toleranced surfaces 23 and recesses 25 which in combination with bore 11 provide for a plurality of fluid bearings, of known principle and popularly often referred to as "air bearings." The following more specific description will explain the function and purpose of this arrangement more clearly. Compressed air, or other gas, is supplied through the opening 26 of support strut 20. The compressed air flows through orifices 22 into counterbores 24 and hence into the narrow gaps 31 which are bounded by surfaces 23 of the support strut 20 and the wall of bore 11 in model body 10. The air finally discharges into recesses 25 which are cut longitudinally with the axis of the strut so as to permit the air to escape freely out of the rear end of model body 10. The size of slots 25 is laid out large enough so that no objectionable back pressure builds up in chamber 12 of bore 11. Of course, other arrangements for venting the chamber 12 of bore 11 can be employed, such as providing passages in the model body 10 connecting chamber 12 to the rear end of model body 10. Such an arrangement would obviate or augment the purpose of slots 25.

Provided that the pressure of the air in opening 26 is adjusted to a proper level, and if certain requirements on the ratio of the size of orifices 22 in relation to the size of gaps 31 are fulfilled in accordance with known design rules for the construction of fluid bearings, model body 10 will "float" on the thin layer of air passing through gaps 31. Thereby friction between surfaces 23 and the wall of bore 11 is eliminated even in the presence of forces normal to the model body within the carrying capacity of the air bearings. Only forces or force components parallel with the axis of the air bearings are unrestrained.

Any suitable means or combination of force sensitive devices may be employed to measure the force reaction in this axis. An arrangement of a spring 41 in combination with a linear differential transformer 40 exemplifies such a device. A soft iron core 42 is attached to model body 10. Core 42 is located inside coil form 43 which is secured to strut 20. Insulated wires 44 are connected to three coils on coil form 43 through an air tight insulating connector 45. By connecting wires 44 to suitable electronic instrumentation, a displacement of core 42 within coil form 43 generates an electric signal which is proportional to the linear displacement of core 42 inside coil form 43. In turn this displacement is proportional to the axial force to be measured which is the intention of the apparatus.

It will be obvious to one skilled in the art, that while I have shown one preferred embodiment of my invention, such is for illustrative purposes only and is not to be interpreted as limiting the scope of the invention. For instance the circular geometry of the air bearings can be replaced by straight sided bearing configurations. Also the air discharging from the bearings may flow into a variety of arrangements of void spaces, ducts or holes as briefly mentioned above. Furthermore, the force sensing element may be replaced by any other suitable kind as well as be located in other suitable positions.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

I claim:

1. A device for measuring a force imposed on a body having a cylindrical aperture axised in the direction of the force, comprising: a source of air flow; a support disposed for projection into the aperture to provide a space between the body and said support and for communication between said source and said space for lateral air bearing of the body, said support having a plurality of orifices with one end opening into said source of air flow, a plurality of counterbores connecting the other end of said orifices to said space between said body and said support thereby providing air for said air bearing between said body and said support, and a plurality of longitudinal recesses axially disposed along said support between said counterbores for providing an escape path for said source of air flow; resilient means for biasing the body from said support disposed for displacement thereto of the body responsive to the force, said means having one of its ends coacting with said body and its other end coacting with said support; and means secured to the body and said support for sensing displacement of said body in response to said force.

2. A device as in claim 1 with said sensing means comprising a plunger and differential transformer coils secured to said support and the body and disposed to provide electrical signals that are indications of the displacement of said body in response to said force.

References Cited in the file of this patent

UNITED STATES PATENTS

| | | |
|---|---|---|
| 2,349,653 | Godsey | May 23, 1944 |
| 2,485,977 | Mains | Oct. 25, 1949 |
| 2,700,305 | Kendall | Jan. 25, 1955 |
| 2,712,965 | Potts | July 12, 1955 |
| 2,756,115 | Michel | July 24, 1956 |
| 2,862,385 | Woods | Dec. 2, 1958 |
| 2,908,164 | Bamber | Oct. 13, 1959 |